United States Patent [19]
Ray

[11] Patent Number: 6,080,283
[45] Date of Patent: *Jun. 27, 2000

[54] PLASMA TREATMENT FOR METAL OXIDE ELECTRODES

[75] Inventor: Robert E. Ray, Strongsville, Ohio

[73] Assignee: Eveready Battery Company, Inc., St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/978,232

[22] Filed: Nov. 25, 1997

[51] Int. Cl.$^7$ ...................................................... B01J 19/08
[52] U.S. Cl. ........................... 204/164; 429/219; 429/222
[58] Field of Search ............................ 204/164; 429/219, 429/222

[56] References Cited

U.S. PATENT DOCUMENTS

| | | | |
|---|---|---|---|
| 3,055,964 | 9/1962 | Solomon et al. | 136/76 |
| 3,336,211 | 8/1967 | Ray | 204/164 |
| 3,615,858 | 10/1971 | Soto-Krebs | 136/107 |
| 3,655,450 | 4/1972 | Soto-Krebs | 136/107 |
| 3,920,478 | 11/1975 | Kozawa | 136/111 |
| 3,925,102 | 12/1975 | Dozawa | 136/111 |
| 4,009,056 | 2/1977 | Megahed | 136/107 |
| 4,015,056 | 3/1977 | Megahed | 429/219 |
| 4,021,598 | 5/1977 | Naruishi | 429/219 |
| 4,038,467 | 7/1977 | Lippold | 429/219 |
| 4,048,405 | 9/1977 | Meghed | 429/219 |
| 4,068,049 | 1/1978 | Naruishi | 429/219 |
| 4,125,689 | 11/1978 | Jumel | 429/219 |
| 4,209,578 | 6/1980 | Balters | 429/219 |
| 4,250,234 | 2/1981 | Langan | 429/219 |
| 5,089,199 | 2/1992 | Fujiwara et al. | 264/83 |
| 5,339,873 | 8/1994 | Feldstein | 429/232 |
| 5,411,821 | 5/1995 | Feldstein | 429/226 |

FOREIGN PATENT DOCUMENTS

| | | |
|---|---|---|
| 481605 | 4/1992 | European Pat. Off. . |
| 55-149642 | 11/1980 | Japan . |
| 2-012762 | 1/1990 | Japan . |
| 0520246 | 8/1993 | Japan . |
| 06295730 | 10/1994 | Japan . |
| 10021933 | 1/1998 | Japan . |

OTHER PUBLICATIONS

Kirk–Othmer, Encyclopedia of Chemical Technology vol. 10, 1980 3rd ed., pp. 262–265. No month available.

F. Brecelj and M. Mozetic, "Reduction of metal oxide thin layers by hydrogen plasma", Vacuum, Technology Applications et Ion Physics, vol. 40, No.1/2, 1990, pp. 177–178. No Month Available.

*Primary Examiner*—Kishor Mayekar
*Attorney, Agent, or Firm*—Robert W. Welsh; Russell H. Toye, Jr.

[57] ABSTRACT

A process for reducing the surface of a metal oxide substrate, such as silver oxide, to form a layer of its metal, such as silver, on the metal oxide substrate by contacting the substrate with a plasma gas excited by a plasma generator.

26 Claims, No Drawings

PLASMA TREATMENT FOR METAL OXIDE ELECTRODES

FIELD OF THE INVENTION

The invention relates to a plasma treatment of the surface of a metal oxide substrate, such as a silver oxide electrode, to reduce the surface of the metal oxide to its elemental metal, such as reducing the surface of a silver oxide electrode to silver metal.

BACKGROUND OF THE INVENTION

One application of the subject invention is directed to metal oxide electrodes for use in electrochemical cells. The battery has become a primary power source for many portable electronic devices such as cameras, radios, hearing aids, watches, calculators and the like. In order to maintain the overall electronic device as compact as possible, many electronic devices are designed with cavities to accommodate miniature cells as their source of power. The cavities are usually made so that a cell can be snugly positioned therein, thus making electronic contact with appropriate terminals within the device. A major potential problem in the use of a high energy density cell such as a divalent silver oxide/zinc/alkaline cell is that if the cell bulges it usually becomes wedged within the cavity of the device which sometimes can result in damage to the device. In addition, when the cell bulges it may disturb the seal whereupon the electrolyte might escape to cause damage to the device and/or oxygen from the atmosphere may enter which could cause wasteful corrosion of the negative electrode. On the other hand, if the seal of the cell is maintained, high internal gas pressure may develop which could cause not only bulging of the cell but even possible disassembly of the cell.

Silver oxide is a poor conductor, having a high resistance of greater than 20 megohm-in/in$^2$. In the past it was advisable to add an electroconductive ingredient, such as graphite, to a silver oxide electrode. Graphite is a good conductive material and therefore it was used to enhance the conductivity of the silver oxide electrode. The addition of graphite will replace some of the active material of the silver oxide electrode, and for a fixed volume cell the capacity of the cell is decreased. It has been found that chemically inert electrical conductors, such as graphite, can be eliminated from a silver oxide electrode if a layer of silver is formed on the silver oxide electrode. Several U. S. patents have addressed the issue of how to reduce silver oxide in order to create a layer of silver on the silver oxide electrode.

U.S. Pat. No. 3,055,964 discloses the use of a heat treatment for electrodes containing divalent silver oxide and monovalent silver oxide so that the electrode will discharge at a constant voltage.

U.S. Pat. No. 4,009,056 discloses a primary alkaline cell having a stable divalent silver oxide depolarizer mix comprising a negative electrode (anode), a divalent silver oxide (AgO) depolarizer mix, a separator between said negative electrode and depolarizer mix, and an alkaline electrolyte. The surface of the depolarizer mix is treated with a mild reducing solution to form a reduced layer surrounding the mix, and the surface of the reduced layer adjacent to the separator is coated with a layer of silver.

U.S. Pat. No. 4,015,056 discloses a method for manufacturing a stable divalent silver oxide depolarizer mix wherein the mix is treated with a mild reducing solution of a reducing agent, such as methanol, followed by a treatment with a strong reducing solution of a reducing agent, such as hydrazine, to form a layer of silver on the surface of the depolarizer mix.

U.S. Pat. No. 4,021,598 discloses a zinc-silver oxide dry cell which comprises a zinc anode, a silver oxide cathode, an immobilized body interposed between the anode and the cathode, and a metallic silver layer formed at least on the surface of the anode side of the cathode in which the metallic silver layer is formed through a reduction reaction resulting from a light exposed to the surface of the cathode.

U.S. Pat. No. 4,048,405 discloses a silver oxide cell whose cathode comprises a mixture of monovalent silver oxide and divalent silver oxide and wherein a portion of the cathode is treated with a strong reducing agent to reduce the surface of the cathode to form a silver layer.

U.S. Pat. No. 4,068,049 discloses a zinc-silver oxide dry cell which comprises a zinc anode, a silver oxide cathode, an immobilized body interposed between the anode and the cathode, and a metallic silver layer formed at least on the anode side surface of the cathode by reduction of silver oxide. Reduction of the silver oxide to form the metallic cathode layer on the cathode surface is effected by causing a reducing agent to contact with the cathode surface or by subjecting the cathode surface to a heat treatment, electrolysis or a mechanical force.

U.S. Pat. No. 4,209,578 discloses an Ag layer that is formed upon an Ag$_2$O electrode by introducing a chemical reducing agent in such a manner that the transformation takes place after the electrode is already in place in the cell cup.

It is known in the art that plasma spraying is a line-of-sight process involving the injection of a substance, such as a powder, into a high temperature plasma jet. Essentially, the plasma torch or generator comprises an anode, such as copper, and a cathode, such as tungsten. A gas, such as argon, flows around the cathode and through the anode which is shaped as a constricting nozzle. An arc is maintained between the cathode and anode which ionizes the gas and thereby produces a plasma stream that exits the torch by way of the nozzle. Generally, a substance, such as a powder, is fed into the plasma jet stream and it is the powder that is then deposited on a substrate placed in the line-of-sight of the nozzle of the plasma torch. This process of plasma deposition or glow-discharge deposition is known in the art and is described in Kirk-Othmer, Encyclopedia of Chemical Technology, Volume 10 at pages 262–265, John Wiley & Sons (3$^{rd}$ Ed. 1980).

It is an object of the present invention to provide a treatment for reducing the surface of a metal oxide substrate to form a layer of its metal on the metal oxide substrate using a plasma gas excited by a plasma generator.

It is another object of the present invention to provide an inexpensive plasma treatment for reducing the surface of a metal oxide substrate to produce a layer of its metal on the surface of the metal oxide substrate.

It is another object of the present invention to provide a treatment for reducing the surface of a metal oxide electrode, such as silver oxide electrode, to form a layer of the metal, such as silver, on the electrode using a plasma gas excited by a plasma generator.

The foregoing and additional objects will become more fully apparent from the following description.

SUMMARY OF THE INVENTION

The invention relates to a process using a plasma generator for reducing the surface of a metal oxide-containing substrate to form a layer of the metal on the substrate by contacting the surface of the substrate with a plasma gas excited by the plasma generator. As used herein, the term "metal oxide-containing substrate" and "metal oxide substrate" can be used interchangeably. "Plasma treatment" shall mean contacting the substrate with plasma gas produced by any plasma generator.

It was discovered that the gas used in a plasma generator to produce a plasma jet or stream can be used without the necessity of having a powder component that is generally required for producing a coated layer on a substrate. According to the subject invention, several types and combinations of gas can be excited in a plasma generator, and then the excited gas upon contacting the metal oxide substrate will reduce the surface of the metal oxide substrate to form a layer of its metal on the metal oxide substrate. The metal layer may be either continuous or discontinuous. Gases suitable for use in this invention can be at least one gas selected from the group consisting of argon, hydrogen, nitrogen, helium and methane. The gas could be an inert gas such as argon, nitrogen, and helium, a reducing gas such as hydrogen and methane, or a combination of an inert gas and a reducing gas. Generally, gases that are not oxidizing gases can be used in this invention.

The thickness of the layer of the elemental metal deposited on the metal oxide substrate can be regulated by controlling the duration of the plasma treatment, the power and/or temperature used in the plasma treatment, the frequency of the plasma generator, and the pressure in the reaction chamber of the plasma generator. For most applications, the preferred thickness of the metal layer to be formed on the metal oxide substrate can be between about 0.1 mil and about 2 mils thick and preferably between about 0.3 mil and 1 mil thick. The power for the plasma generator has to be sufficient to produce a glow discharge of the gas.

Metal oxide substrates suitable for use in this invention can be selected from the group consisting of silver oxide, cadmium oxide, and lithium oxide. For battery applications, the suitable metal oxide substrate can be selected from the group of electrodes consisting of silver oxide (divalent and/or monovalent silver oxide) and cadmium oxide.

The elimination of an inert electrical conductive component, such as graphite, from silver oxide cells, makes it possible to increase an amount of silver oxide in the electrode by the amount of graphite eliminated, and since silver oxide is an active ingredient for the electrode then the capacity of the cell can be increased.

In accordance with one embodiment of this invention, a silver oxide electrode having a surface layer of silver would be ideally suitable for use in alkaline silver oxide-zinc cells having a negative electrode of zinc, a positive electrode of the silver-coated silver oxide and an alkaline electrolyte.

EXAMPLE 1

Positive electrodes comprising primarily monovalent silver oxide were pressed into disk shaped pellets. The positive electrodes were arranged into a single layer on an open mesh screen so that the positive electrodes were not touching each other. The screen was then inserted into a plasma generator's enclosed chamber. The chamber was filled with argon gas, which was excited by activating the plasma generator such that its energy output was approximately 300 watts at a radio frequency of 13.56 megahertz. The excited gas within the chamber emitted a dull glow throughout the central portion of the chamber. The process was continued for approximately five minutes, and then the screen with the positive electrodes was withdrawn from the chamber. An examination of the positive electrodes revealed that a uniform layer of silver had formed on the surfaces of the silver oxide positive electrodes. The resistance of the positive electrodes was reduced from more than twenty megohms (the limit of the multimeter used) to less than two ohms thereby providing a desirable conductivity for those positive electrodes for use in cell applications. The layer of silver was formed by reduction of the monovalent silver oxide to metallic silver. Upon cutting the positive electrodes in half, it was revealed that the layer of silver was thin and the interior portion of the positive electrodes had not been reduced to metallic silver.

EXAMPLE 2

Several silver oxide positive electrodes were made and were placed into a chamber containing a plasma generator. The chamber was pumped to 0.5 torr, held for two to three minutes with an argon gas atmosphere to remove oxygen from the chamber. The positive electrodes were treated for five minutes at 300 watts using 90% argon/10% hydrogen gas. The positive electrodes were then held at 0.5 torr for two to three minutes to cool the positive electrodes. An examination of the positive electrodes revealed that a uniform layer of silver had formed on the surface of the silver oxide positive electrodes.

EXAMPLE 3

Several positive electrodes containing 64% monovalent silver oxide, 35% manganese dioxide and 1% inert material (Sample A) and several positive electrodes containing 85% monovalent silver oxide, 14% manganese dioxide and 1% inert material (Sample B) were made and they were subject to the same plasma treatment as disclosed in Example 2 except the time periods for the plasma treatment were different. The following table discloses the data obtained from subjecting the positive electrodes to the plasma treatment for various time periods.

TABLE

| Sample Positive Electrode | Time (Minutes) | Resistance (Ohms) |
|---|---|---|
| A | 0.1 | 10,000 |
| B | 0.1 | 8,000,000 |
| A | 1.0 | 100 |
| B | 1.0 | 0.8 |
| A | 2.0 | 5.0 |
| B | 2.0 | 0.4 |
| A | 3.0 | 2.5 |
| B | 3.0 | 0.25 |
| A | 4.0 | 1.4 |
| B | 4.0 | 0.2 |
| A | 5.0 | 0.8 |
| B | 5.0 | 0.2 |
| A | 20.0 | 0.3 |
| B | 20.0 | 0.2 |

As shown in the table, the resistance of the 85% silver oxide positive electrode drops from 8 megohms to less than one ohm after one minute. The manganese dioxide content had a large effect on the positive electrodes since the positive electrodes with the larger amount of manganese dioxide stalled out with a much lower resistance of 10,000 ohms but required five minutes of plasma treatment to get below a resistance of one ohm.

It is to be understood that other modifications and changes can be made to the invention herein described without departing from the spirit and scope of the invention. For example, if the metal oxide is mixed with another component and then the substrate is formed, then it is possible that only the portion of the metal oxide exposed on the surface will be reduced to the metal thereby forming a non-continuous metal layer. On a homogeneous metal oxide material, the surface can be reduced to provide a continuous metal layer using the plasma treatment in accordance with this invention.

What is claimed is:

1. A process for treating a battery cell electrode comprising contacting a portion of a surface of a metal oxide substrate of the battery cell electrode with at least one gas excited by a plasma generator to reduce the surface of the metal oxide substrate to form a layer of its metal on at least a portion of the surface of the substrate, wherein the metal oxide below the treated surface of the substrate is not reduced to metal.

2. The process of claim 1 wherein said at least one gas is selected from the group consisting of argon, hydrogen, nitrogen, helium and methane.

3. The process of claim 1 wherein the layer of the metal on the surface of the metal oxide substrate is between 0.1 mil and 2 mils thick.

4. The process of claim 1 wherein the metal layer on the surface of the metal oxide substrate is a continuous layer.

5. the process of claim 1 wherein the metal layer on the surface of the metal oxide substrate is non-continuous layer.

6. The process of claim 1 wherein the metal oxide is at least one selected from the group consisting of silver oxide and cadmium oxide.

7. The process of claim 6 wherein the metal oxide is silver oxide.

8. The process of claim 6 wherein the metal oxide is cadmium oxide.

9. The process of claim 6 wherein the metal layer on the surface of the metal oxice substrate is a non-continuous layer.

10. The process of claim 6 wherein said at least one gas is selected from the group consisting of argon, hydrogen, nitrogen, helium, and methane.

11. The process of claim 6 wherein the layer of the metal on the surface of the metal oxide substrate is between 0.1 mil and 2 mils thick.

12. The process of claim 6 wherein the metal layer on the surface of the metal oxide substrate is a continuous layer.

13. The process of claim 12 wherein the metal oxide is silver oxide and the metal layer is silver.

14. The process of claim 6 wherein the metal oxide is silver oxide and the metal layer is silver.

15. The process of claim 6 wherein the metal layer is cadmium and the layer of cadmium metal is a non-continuous layer.

16. The process of claim 6 wherein the metal oxide substrate with the metal layer is a first electrode and said process further comprises assembling a second electrode along with the first electrode and an electrolyte to produce a battery cell.

17. The process of claim 16 wherein the second electrode comprises zinc, the first electrode comprises silver oxide and the electrolyte is an alkaline electrolyte.

18. The process of claim 17, wherein the silver oxide is selected from the group consisting of divalent silver oxide, monovalent silver oxide and mixtures thereof.

19. The process of claim 1 wherein the at least one gas is excited by a plasma generator in a partial vacuum.

20. The process of claim 1 wherein a chamber encloses the battery electrode, the plasma generator and the at least one gas, and the exited gas emits a glow throughout a central portion of the chamber.

21. The process of claim 1 wherein the metal layer is formed on substantially the entire surface of the substrate.

22. A process for treating a battery cell electrode comprising contacting a surface of a metal oxide substrate of the battery cell electrode with at least one gas excited by a plasma generator to reduce the surface of the metal oxide substrate to form a layer of its metal on the surface of the substrate, wherein the metal oxide below the treated surface of the substrate is not reduced to metal.

23. The process of claim 22 wherein the layer of metal on the surface of the metal oxide substrate is between 0.1 mil and 2 mils thick.

24. The process of claim 22 wherein the at least one gas is excited by a plasma generator in a partial vacuum.

25. The process of claim 22 wherein a chamber encloses the battery electrode, the plasma generator and the at least one gas, and the excited gas emits a glow throughout the central portion of the chamber.

26. The process of claim 22 wherein the metal layer is formed on substanially the entire surface of the substrate.

* * * * *